(12) United States Patent
Hocquette

(10) Patent No.: US 9,784,572 B2
(45) Date of Patent: Oct. 10, 2017

(54) DEVICE FOR MEASURING THE ANGULAR POSITIONS OF A ROTORCRAFT BLADE ELEMENT RELATIVE TO A ROTOR HUB, AN ASSOCIATED ROTOR, AND A CORRESPONDING MEASUREMENT METHOD

(71) Applicant: AIRBUS HELICOPTERS, Marignane (FR)

(72) Inventor: Julien Hocquette, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 93 days.

(21) Appl. No.: 14/948,634

(22) Filed: Nov. 23, 2015

(65) Prior Publication Data

US 2016/0153775 A1 Jun. 2, 2016

(30) Foreign Application Priority Data

Nov. 27, 2014 (FR) ...................................... 14 02694

(51) Int. Cl.
*G01B 11/26* (2006.01)
*B64C 27/00* (2006.01)

(52) U.S. Cl.
CPC ............ *G01B 11/26* (2013.01); *B64C 27/008* (2013.01)

(58) Field of Classification Search
CPC .............................. G01B 11/26; B64C 27/008

USPC .................................. 356/5.01, 138, 139.03
See application file for complete search history.

(56) References Cited

U.S. PATENT DOCUMENTS

| 4,604,526 A | 8/1986 | Moir |
| 2012/0292438 A1 | 11/2012 | Sreetharan et al. |
| 2014/0226153 A1 | 8/2014 | Sun et al. |

FOREIGN PATENT DOCUMENTS

| GB | 1116748 | 6/1968 |
| JP | 2010149602 | 7/2010 |

OTHER PUBLICATIONS

French Search Report for French Applicaton No. FR 1402694, Completed by the French Patent Office dated Jul. 31, 2015, 7 Pages.
Harris et al. Proceedings of the fourth Alvey Vision Conference Aug. 31 to Sep. 2, 1988, pp. 147-152, "A combined corner and edge detector".
Boden et al. Proc of SPIE 2010, vol. 7522, 10 Pages, "Application of Image Pattern Correlation for non-intrusive deformation measurements of fast rotating objects on aircrafts".

*Primary Examiner* — Daniel L Murphy
(74) *Attorney, Agent, or Firm* — Brooks Kushman P.C.

(57) ABSTRACT

A measurement device for measuring the angular positions of a blade element of a rotorcraft, the blade element being arranged to be movable relative to a hub of a rotor in pivoting about at least one pivot axis. The invention also relates to a rotorcraft fitted with such a measurement device and to a corresponding measurement method.

16 Claims, 2 Drawing Sheets

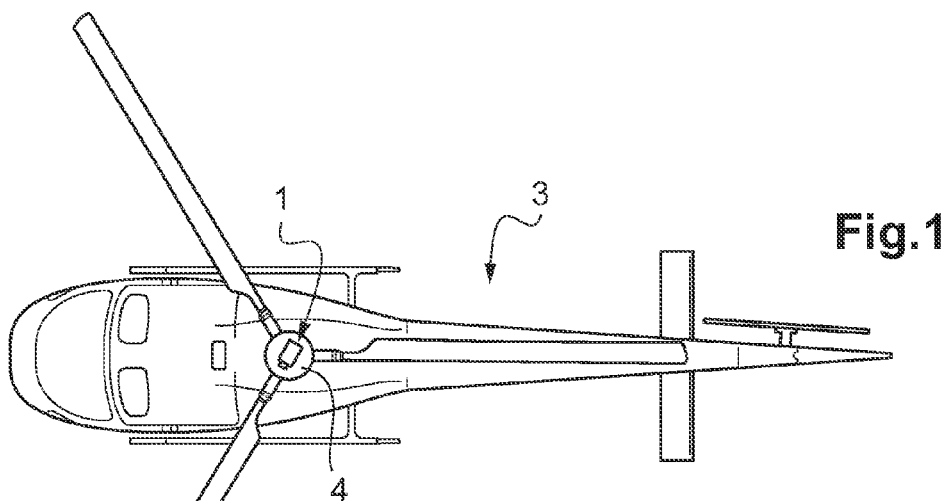
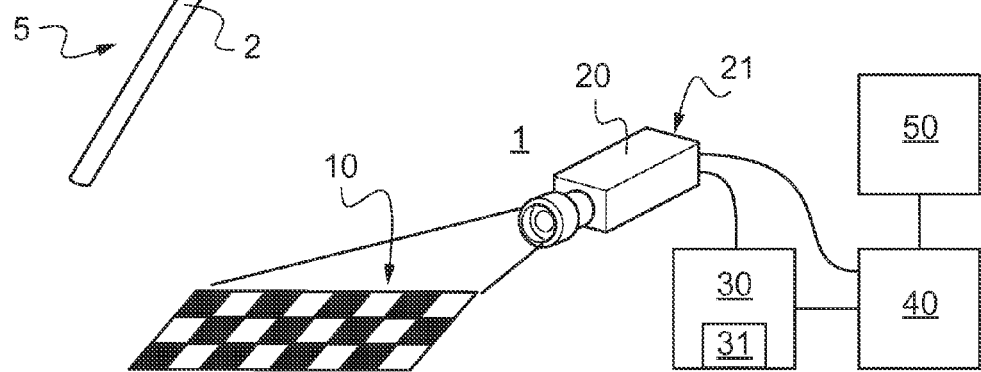
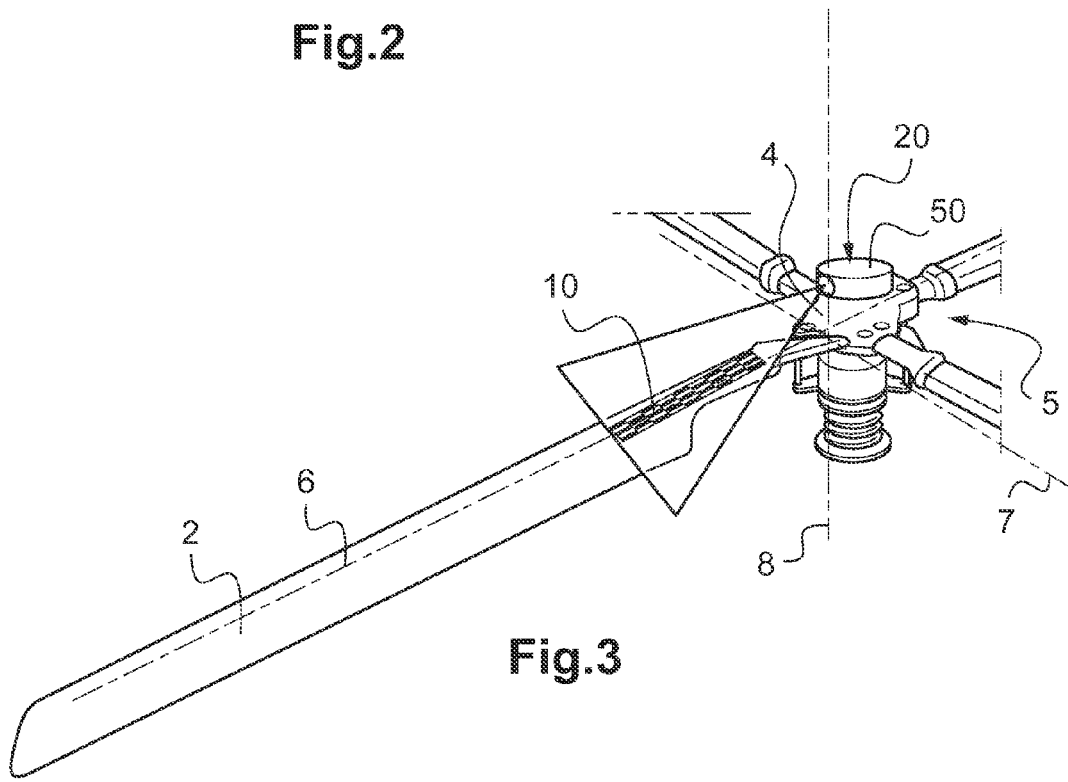

DEVICE FOR MEASURING THE ANGULAR POSITIONS OF A ROTORCRAFT BLADE ELEMENT RELATIVE TO A ROTOR HUB, AN ASSOCIATED ROTOR, AND A CORRESPONDING MEASUREMENT METHOD

CROSS REFERENCE TO RELATED APPLICATION

This application claims priority to French patent application No. FR 14 02694 filed on Nov. 27, 2014, the disclosure of which is incorporated in its entirety by reference herein.

BACKGROUND OF THE INVENTION (1) Field of the Invention

The present invention relates to a measurement device for determining the angular positions about at least one pivot axis of a rotorcraft blade element relative to a hub of a main lift and propulsion rotor, or of an anti-torque rotor.

(2) Description of Related Art

During the rotation of the hub of a rotor of a rotorcraft, e.g. such as a helicopter, a blade element is generally suitable for pivoting about three pivot axes in a rotating orthogonal reference frame associated with the hub.

A first pivot axis is referred to as the "pitch" axis and enables the aerodynamic angle of incidence of the blade to be modified, and consequently makes it possible to modify the aerodynamic forces on the blade that give rise to the lift and the traction that the rotor exerts on the rotorcraft. Such a pitch axis thus extends substantially parallel to a longitudinal direction corresponding to the span of the blade element.

A second pivot axis is referred to as the "flapping" axis and it enables a free end of the blade element to move substantially perpendicularly relative to the plane of rotation of the rotor. Such a flapping axis is thus substantially contained in the plane of rotation of the blades of the rotor.

A third pivot axis is referred to as the "lead/lag" axis and is arranged substantially perpendicularly relative to the first and second pivot axes of the blade element.

The invention thus seeks more particularly to provide a measurement device making it possible to sense and store automatically data about these angular positions that vary throughout the rotation of the rotor, including during each revolution.

It is of particular interest to be able to evaluate the pivoting movements of a rotor blade element during a predetermined limited period in time or throughout the lifetime of the rotorcraft. Such measurement of these pivoting movements, during normal flight conditions, makes it possible to understand and evaluate very accurately the dynamic stresses to which the rotor of a rotorcraft is subjected.

In general manner, in order to measure the angular positions of a blade element, it is known to use devices for measuring the positions of a rotorcraft blade element that carries targets or patterns of randomly distributed points. Such targets or patterns are then fitted on the blade element in order to identify the flapping angle of blade elements during each rotation of a rotor. Such measurement devices are described in particular in Documents U.S. Pat. No. 4,604,526 and GB 1 116 748, or indeed in a technical publication entitled "Application of image pattern correlation for non-intrusive deformation measurements of fast rotating objects on aircraft", given the reference XP040515416 in the database of non-patent works in the European Patent Office, and written by Fritz Boden, Kai Bodensiek, and Boleslaw Stasicki.

Although such a technical publication discloses the use of a camera for taking photos of a pattern placed on a blade element, that pattern of randomly arranged points does not enable the various angular positions of the blade element under consideration to be measured quickly and simply.

Furthermore, the camera is arranged on a stationary portion of the rotorcraft fuselage and not in a rotating reference frame such as the hub of a rotor. In addition, such a measurement device also requires a stroboscopic lamp in order to facilitate the taking of the photos of the pattern, and their subsequent analysis.

Thus, such a measurement device is very complex to implement for the purpose of identifying the angular positions of the blade element, and it does not enable these angular positions to be measured over a complete revolution of the rotor.

Furthermore, use has also been made of optical sensors such as described in Documents JP 2010/149602 or US 2014/226153. Those documents propose measurement devices in which a light source is placed on the blade and a detector is placed on the hub. Such a solution can thus serve only for measuring the flapping angle of the blade element.

Such a device also requires the blade element to be fitted with a source of light that needs to be housed in and secured to the blade element. Incorporating such a light source thus makes it necessary to modify the structural design of the blade element.

Furthermore, it is also necessary to convey electricity to the light source so as to enable it to emit light. It is particularly difficult to take electricity to a rotorcraft rotor, i.e. in a rotating reference frame. Furthermore, relative movements between the various parts of the rotor can lead to wear in electrical contacts and render such a solution unreliable over time.

In addition, however small such a light source may be, it gives rise to additional rotating weight and thus requires the rotor to be rebalanced.

BRIEF SUMMARY OF THE INVENTION

An object of the present invention is thus to propose a measurement device, a rotorcraft, and a method enabling the above-mentioned limitations to be overcome. The measurement device can thus make it possible to conserve an existing structural design for the blade elements of the rotor and to provide a solution that is simple, safe, effective, and reliable over time so as to measure the angular positions of a blade element relative to an orthogonal reference frame associated with said rotor.

The invention thus relates to a measurement device for measuring the angular positions of a blade element of a rotorcraft, the blade element being arranged to be movable relative to a hub of a rotor in pivoting about at least one pivot axis. In other words, the blade element possesses at least one degree of freedom in pivoting relative to the hub of the rotor.

According to the invention, the device comprises:

at least one checkerboard pattern suitable for being secured to the blade element, the checkerboard pattern comprising two groups of surfaces presenting respective different luminance factors, each surface of a first group presenting a first luminance factor and being juxtaposed with at least one surface of a second group presenting a second luminance factor, the first luminance factor being greater than the second luminance factor;

at least one camera suitable for taking a plurality of images of the checkerboard pattern as a function of time, the camera being suitable for being secured to the hub;

a synchronization member that serves to allocate a time parameter to each image taken by the camera, which parameter is a function of the azimuth angle of the rotor;

a memory suitable for storing each image together with the corresponding time parameter; and a computer enabling the angular positions of the blade element to be determined automatically relative to at least one pivot axis from the images of the checkerboard pattern.

In other words, the device in accordance with the invention makes it possible to determine the various positions of a blade element by using a checkerboard pattern that is fitted on a rigid portion of a blade and that is practically undeformable under normal stresses of the rotor. Thus, such a rigid portion can advantageously be formed by a root of the blade, and the checkerboard pattern may be formed by a printed film, e.g. of plastics material or of cellulose.

Furthermore, in order to secure the checkerboard pattern on the blade element, various solutions can be envisaged, and in particular using adhesive, electrostatic and/or magnetic force, self-gripping strips having loops and hooks, or snap-fastener means.

Under such conditions, the first luminance factor of the first group of surfaces of the checkerboard pattern is advantageously selected to be close to the number 1, since the surfaces of the first group are preferably selected to be white in color. In contrast, the second luminance factor of the second group of surfaces of the checkerboard pattern is advantageously selected to be close to the number 0, since the surfaces of the second group are preferably selected to be black in color. Strong contrast between the surfaces of the first and second groups thus makes it possible to guarantee easy processing of the images taken by the camera and thereby maximize accuracy when determining the angular positions of the blade element.

The camera is thus arranged on the hub of the rotor and it is pointed so as to enable it to "observe" the checkerboard pattern continuously in its field of view. Such a camera is thus secured by being embedded in the hub, using securing means such as bolts, straps, rivets, or the like.

In addition, depending on the instant at which an image is taken, the synchronization member makes it possible to determine an azimuth position for an image, and consequently to plot a curve of the angular positions of the blade element as a function of the azimuth positions of the rotor.

The computer determines the relative positions of the checkerboard pattern in three-dimensional space for all of the images taken by the camera. For this purpose, an operator may in particular act manually to define an absolute position for the checkerboard pattern in an image corresponding to a determined position of the blade element under consideration. In practice, and by way of example, such a predetermined position is obtained by positioning the checkerboard pattern so that a succession of juxtaposed surfaces making it up is in alignment with a line forming the horizon when the rotor is stopped.

Another technique could consist in using an accurate angle-measuring device for the purpose of manually measuring the position of the checkerboard pattern relative to a known frame of reference, such as for example a frame of reference in a hangar.

Advantageously, the computer may determine the angular positions of the blade element about three pivot axes forming an orthogonal reference frame associated with the hub, the orthogonal reference frame having a first axis, referred to as a "pitch" axis, a second axis, referred to as a "flapping" axis, and a third axis, referred to as a "lead/lag" axis.

In other words, the measurement device serves to identify the angular positions of the blade element about the above-described three pivot axes of the blade element relative to the rotor hub. The measurement device thus makes it possible to measure simultaneously the pitch angle θ, the flapping angle β, and the lead/lag angle δ of the blade element as a function of the azimuth angle ψ of the rotor.

The synchronization member may be of various forms.

In a first embodiment, the synchronization member may include a sensor enabling each revolution of the rotor to be detected.

Under such circumstances, the azimuth reference is given by the "pip" of a rotor position sensor that is delivered once for every revolution of the rotor through 360°. Images taken by the camera are then stored in the memory together with the signal coming from this sensor. Such a sensor may in particular be of the magnetic or optical type in order to identify each new revolution of the rotor.

Thus, knowing firstly the acquisition frequency Fs of the camera, and secondly the angular speed of rotation ω of the rotor, it is possible to calculate the azimuth angle ψi of each image using the following formula:

$$\psi i = \frac{i * \omega}{Fs}$$

In a second embodiment, the synchronization member may use an element that is stationary relative to the fuselage of the rotorcraft and that is present in the images taken by the camera, such as for example the tail boom of the rotorcraft. Such a tail boom appears in the field of view of the camera only once during each revolution. It then corresponds to an azimuth angle ψ0=0°.

Likewise, the computer and the memory may be of various forms and they may be members that are secured to the rotorcraft, or members that are removable.

Thus, in a first configuration of the invention, the computer is arranged on the rotorcraft.

Under such circumstances, the memory is also advantageously arranged on the rotorcraft and the data it contains is used directly by the computer in order to determine the angular positions of the blade element as a function of the azimuth angle of the rotor.

Furthermore, and in a first variant of the first configuration, the computer may be suitable for being secured to the hub of the rotor in the proximity of the camera.

In other words, the computer rotates with the rotor relative to the fuselage of the rotorcraft.

In a second variant of the first configuration, the computer may be suitable for being arranged on a portion that is stationary relative to a fuselage of the rotorcraft.

Under such circumstances, the computer is arranged to be stationary relative to the fuselage of the rotorcraft.

Finally, in a second configuration of the invention, the computer may be remote from the rotorcraft.

Thus, use is made of the images for measuring the angular positions of the rotorcraft blade element on an auxiliary member, such as a computer that is not on board the rotorcraft.

Under such circumstances, and advantageously, the memory may be of the removable type and may co-operate with an interface secured to the camera.

Once the images have been taken, they are stored in the memory in synchronized manner relative to the time parameter. The memory can thus be removable, and it can be in the form of a memory card, for example, which card is extracted from a read/write interface arranged directly on the camera.

The card is then inserted into another interface connected to a computer outside the rotorcraft. The data from the camera images is then made use of by a computer that is independent of the rotorcraft.

Furthermore, in practice, the checkerboard pattern may comprise:

at least three rows formed by respective alternations of surfaces presenting different luminance factors, the rows being mutually parallel and arranged on the blade element in a direction parallel to a pitch axis of the blade element; and at least three columns formed by respective alternations of surfaces presenting different luminance factors, the columns being mutually parallel and arranged on the blade element in a direction parallel to a flapping axis of the blade element.

In other words, the checkerboard pattern is arranged on the blade element so that the rows of the pattern are parallel to a direction corresponding to its span and so that the columns are perpendicular to that direction.

In a particular embodiment, the checkerboard pattern may have five rows formed by respective alternations of surfaces presenting different luminance factors, and nine columns formed by respective alternations presenting different luminance factors.

Such a checkerboard pattern makes it possible to guarantee optimized use of the images taken by the camera in order to determine the angular positions of the blade element over one revolution of the rotor.

Advantageously, the checkerboard pattern may include a surround having a luminance factor that is substantially equal to the first luminance factor of the first group of surfaces.

In other words, the surround of the rows and columns is substantially white in color and enables each row and column of the pattern to be clearly identified.

In practice, the surfaces of the first and second groups may be square in shape.

In this way, all of the surfaces of the first and second groups present the same dimensions in length and in width. Such an arrangement then makes it possible to simplify the algorithm for recognizing internal corners within the pattern defined by their pixel positions (px, py) in the image. For this purpose, it suffices to specify the number of surfaces in the directions X and Y in a right-handed orthogonal reference frame associated with the checkerboard pattern.

In a particular embodiment, the checkerboard pattern may include surfaces of the second group arranged at each of the corners of the shape defined by the two groups of surfaces.

Thus, the surfaces of the first group and the surfaces of the second group are positioned so as to form a rectangle or a square having a surface of the second group in each of its corners. Such an arrangement, in combination with a surround having a luminance factor that is substantially equal to the first luminance factor, thus makes it possible to guarantee good recognition of the corners of the shape defined by the set of surfaces in the first and second groups.

The processing of the images taken by the camera then makes it possible to recognize the positions of the corners of the checkerboard pattern and the corners of each surface making it up, and also makes it possible to determine the mathematical transformation for determining the angular positions of the corresponding blade element.

The invention also provides a rotorcraft that is remarkable in that it includes a measurement device for measuring the angular positions of a blade element relative to a hub of a rotor as described above.

In other words, the invention is not limited to a device for measuring the angular positions of a rotorcraft blade element. The invention also provides a rotorcraft comprising:

at least one checkerboard pattern suitable for being secured to the blade element, the checkerboard pattern comprising two groups of surfaces presenting respective different luminance factors, each surface of a first group presenting a first luminance factor and being juxtaposed with at least one surface of a second group presenting a second luminance factor, the first luminance factor being greater than the second luminance factor;

at least one camera suitable for taking a plurality of images of the checkerboard pattern as a function of time, the camera being secured to the hub;

a synchronization member that serves to allocate a time parameter to each image taken by the camera, which parameter is a function of the azimuth angle of said rotor;

a memory suitable for storing each image together with the corresponding time parameter; and a computer enabling the angular positions of the blade element to be determined automatically relative to at least one pivot axis from the images of the checkerboard pattern.

Such a rotorcraft thus enables a plurality of images to be taken of a checkerboard pattern secured to the blade element. It then enables the images to be processed so as to recognize the positions of the corners of the pattern and the corners of each of the surfaces making it up.

The present invention also provides a method of measuring the angular positions about at least one pivot axis of a blade element of a rotorcraft relative to a hub of a rotor. According to the invention, such a method comprises the steps consisting in:

securing at least one checkerboard pattern to the blade element, the checkerboard pattern comprising two groups of surfaces presenting respective different luminance factors, each surface of a first group presenting a first luminance factor and being juxtaposed with at least one surface of a second group presenting a second luminance factor, the first luminance factor being greater than the second luminance factor;

securing to the hub at least one camera suitable for taking a plurality of images of the checkerboard pattern as a function of time;

taking a plurality of images of the checkerboard pattern during a rotation of said rotor;

synchronizing each image taken by the camera with a time parameter that is a function of an azimuth angle of said rotor;

storing each image together with the corresponding time parameter; and automatically determining the angular positions of the blade element to be determined automatically relative to at least one pivot axis from the images of the checkerboard pattern.

In other words, the invention also provides a method of measuring the angular positions of a blade element relative to a rotor hub. In the method, a plurality of images are taken of a checkerboard pattern secured to the blade element, and then the images are processed so as to recognize the positions of the corners of the pattern and of the corners of each of the surfaces making it up.

In a particular implementation, the measurement method may comprise a step of determining the angular positions of the blade element about three pivot axes forming an orthogonal reference frame associated with the hub, the orthogonal reference frame comprising a first axis, referred to as a "pitch" axis, a second axis, referred to as a "flapping" axis, and a third axis, referred to as a "lead/lag" axis.

In this way, the method makes it possible to measure the three-dimensional positions of the blade element relative to the rotor hub as a function of time. The measurement method thus makes it possible to identify the angular positions in three degrees of freedom of pivoting of the blade element relative to the hub.

Advantageously, the measurement method may enable five to images of the checkerboard pattern to be taken over one revolution of the rotor.

Thus, such a method can use a camera having an acquisition frequency lying in the range 25 images/second to 200 images/second. Depending on the speed of rotation of the rotor, such a camera makes it possible, by way of example, to take images of the checkerboard pattern at least once every 50 degrees of a revolution, and at most once every 5 degrees of a revolution.

BRIEF DESCRIPTION OF THE SEVERAL VIEWS OF THE DRAWINGS

The invention and its advantages appear in greater detail from the following description of examples given by way of illustration and with reference to the accompanying figures, in which:

FIG. 1 is a plan view of a rotorcraft fitted with a measurement device in accordance with the invention;

FIG. 2 is a functional diagram showing a measurement device in accordance with the invention;

FIG. 3 is a fragmentary perspective view of a rotorcraft rotor in a first variant of the first configuration in accordance with the invention;

Figure 4:
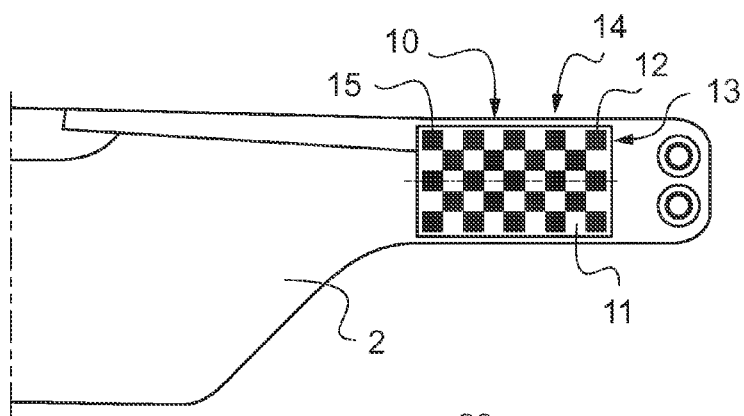
FIG. 4 is a plan view of a rotorcraft rotor blade element that is provided with a checkerboard pattern, in accordance with the invention.

Elements present in more than one of the figures are given the same references in each of them.

DETAILED DESCRIPTION OF THE INVENTION

As mentioned above, the invention relates to the field of rotorcraft, and more particularly to the field of devices for measuring the angular positions of blade elements of a rotorcraft rotor.

Thus, and as shown in FIG. 1, the measurement device 1 makes it possible to determine the angular positions of the blade elements 2 of a rotor 5 about at least one pivot axis relative to the hub 4 for driving the blade element 2 in rotation.

Furthermore, and as shown in FIGS. 2 and 3, the device 1 fitted to the rotorcraft 3 comprises a checkerboard pattern 10, a camera 20, a synchronization member 30, a memory 40, and a computer 50. The measurement device 1 thus enables the angular positions of the blade elements 2 to be measured about one of three pivot axes 6, 7, and 8 forming an orthogonal reference frame. Such an orthogonal reference frame comprises a first axis 6, referred to as the "pitch" axis, a second axis 7, referred to as the "flapping" axis, and a third axis 8, referred to as the "lead/lag" axis.

Such a checkerboard pattern 10 is thus suitable for being secured to a rigid portion of the blade element 2. The camera 20 is secured to the hub 4 of the rotor 5 and enables a plurality of images to be taken of the checkerboard pattern 10 during each revolution of the rotor 5.

The synchronization member 30, which may for example include a sensor 31, serves to allocate a first time parameter to each image from the camera 20, which parameter is a function of the azimuth angle of said rotor 5. The images from the camera 20 are thus stored in a memory 40 via an interface 21 which may in particular be in the form of a card reader or of a communications port when the memory 40 is of the removable type, such as a memory card or a universal serial bus (SUB) key, for example.

Finally, a computer 50 serves to measure angular positions of the blade element 2 on the basis of the images of the checkerboard pattern 10 secured thereto.

As shown in FIG. 3, in a first variant of a first configuration of the invention, the computer 50 may be secured to the camera 20, and consequently may be arranged on the hub 4 of the rotor 5.

As shown in FIGS. 3 and 4, the checkerboard pattern 10 has two groups of surfaces 11 and 12 presenting respective different luminance factors. The surfaces 11 thus form a first group presenting a first luminance factor and they are juxtaposed with surfaces 12 of a second group presenting a second luminance factor. Furthermore, in order to distinguish them, the first luminance factor is selected to be greater than the second luminance factor.

In addition, the checkerboard pattern 10 is made up of five rows 13 made up of alternating surfaces 11 and 12, and nine columns 14 likewise made up of alternating surfaces 11 and 12. The rows 13 are mutually parallel and positioned on the blade elements 2 in a direction that is parallel to the pitch axis 6 of the blade element 2. In analogous manner, the columns 14 are mutually parallel and they are positioned on the root of the blade elements 2 in a direction parallel to a flapping axis 7 of the blade element 2.

Furthermore, the checkerboard pattern 10 also has a surround 15 arranged at the periphery of the gridded zone formed by the rows 13 and columns 14 of juxtaposed surfaces 11 and 12 having different luminance factors. Such a surrounded 15 is then advantageously selected to have a luminance factor that is substantially equal to the luminance factor of the surfaces 11 of the first group, when the surfaces 12 of the second group are arranged at the four corners of the gridded zone formed by the rows 13 and columns 14.

Figure 5:
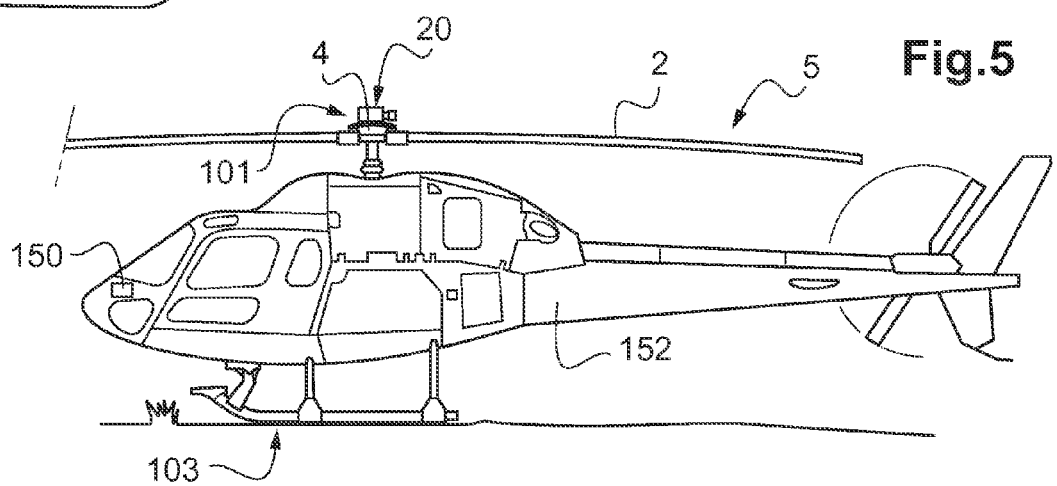
FIG. 5 is a side view of a rotorcraft fitted with a measurement device in a second variant of the first configuration in accordance with the invention.

As shown in FIG. 5, and in a second variant of the first configuration of the invention, the measurement device 101 may include a computer 150 secured to a stationary portion of the fuselage 152 of the rotorcraft 103. Under such circumstances, only the camera 20 is secured to the hub 4 of the rotor 5.

Naturally, the computer may also be formed by an auxiliary member that is independent of the rotorcraft, such as a personal computer (PC).

Furthermore, and as shown in FIGS. 6 to 9, the images from the camera 20 are two-dimensional representations of the checkerboard pattern 10, and they are of shape that can vary as a function of the angular position of the blade element.

Figure 6:
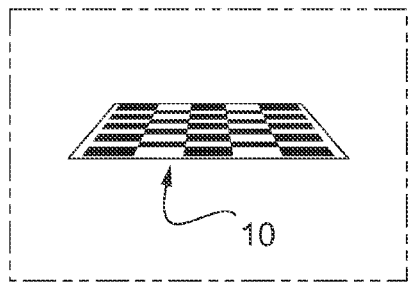
FIGS. 6 to 9 are various images of a checkerboard pattern obtained with the camera of the measurement device in accordance with the invention.

Thus, as shown in FIG. 6, the image from the camera corresponds to a neutral position of the blade element when the pitch, flapping, and lead/lag angles are substantially zero in a pre-established convention.

Figure 7:
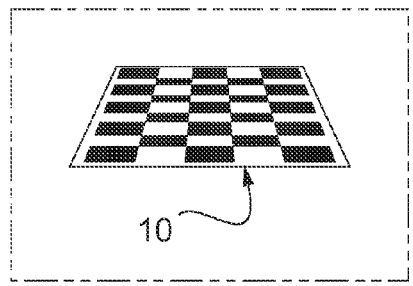

In contrast, and as shown in FIG. 7, the image from the camera then corresponds to a first position of the blade element when the pitch and drag angles are substantially zero while the flapping angle is non-zero, using said convention.

Figure 8:
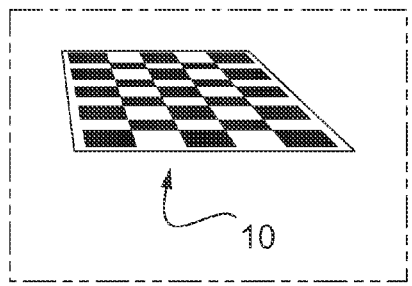

Likewise, as shown in FIG. 8, the image from the camera corresponds to a second position of the blade angle when the pitch angle is zero while the flapping and lead/lag angles are non-zero, still using said convention.

Figure 9:
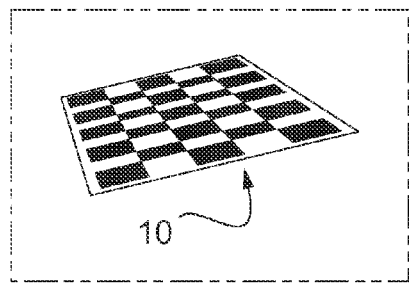

Finally, as shown in FIG. 9, the image from the camera corresponds to the blade element being in a position when the pitch, flapping, and lead/lag angles are all non-zero.

An algorithm for recognizing shapes and positions of the pixels making up the checkerboard pattern then makes it possible to determine the three-dimensional mathematical transformation that corresponds to each image, and thus to determine the angular positions of the blade element relative to the rotor hub.

Such an algorithm is in particular known and consists in identifying and extracting singular points from an image such as angles or corners. Such a method is generally referred to in the literature as a "corner extraction" method or indeed as the "Harris-Stephens" method. This method is described in particular in an article written jointly by Chris Harris and Mike Stephens: "A combined corner and edge detector", which is taken from a report on a conference that was held at the University of Manchester on Aug. 31 to Sep. 2, 1988 entitled "Proceedings of the fourth Alvey Vision Conference", and which may be consulted in particular at the following Internet address:

http://www.bmva.org./bmvc/1988/avc-88-023.pdf

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A measurement device for measuring the angular positions of a blade element of a rotorcraft, the blade element being arranged to be movable relative to a hub of a rotor in pivoting about at least one pivot axis, the measurement device comprising:
    at least one checkerboard pattern suitable for being secured to the blade element, the checkerboard pattern comprising two groups of surfaces presenting respective different luminance factors, each surface of a first group presenting a first luminance factor and being juxtaposed with at least one surface of a second group presenting a second luminance factor, the first luminance factor being greater than the second luminance factor;
    at least one camera suitable for taking a plurality of images of the checkerboard pattern as a function of time, the camera being suitable for being secured to the hub;
    a synchronization member that serves to allocate a time parameter to each image taken by the camera, which parameter is a function of the azimuth angle of the rotor;
    a memory suitable for storing each image together with the corresponding time parameter; and
    a computer enabling the angular positions of the blade element to be determined automatically relative to at least one pivot axis from the images of the checkerboard pattern.

2. A device according to claim 1, wherein the computer determines the angular positions of the blade element about three pivot axes forming an orthogonal reference frame associated with the hub, the orthogonal reference frame having a first axis, referred to as a "pitch" axis, a second axis, referred to as a "flapping" axis, and a third axis, referred to as a "lead/lag" axis.

3. A device according to claim 1, wherein the synchronization member includes a sensor enabling each revolution of the rotor to be detected.

4. A device according to claim 1, wherein the computer is arranged on the rotorcraft.

5. A device according to claim 4, wherein the computer is suitable for being secured to the hub of the rotor in the proximity of the camera.

6. A device according to claim 4, wherein the computer is suitable for being arranged on a portion that is stationary relative to a fuselage of the rotorcraft.

7. A device according to claim 1, wherein the memory is of the removable type and co-operates with an interface secured to the camera.

8. A device according to claim 1, wherein the checkerboard pattern comprises:
    at least three rows formed by respective alternations of surfaces presenting different luminance factors, the rows being mutually parallel and arranged on the blade element in a direction parallel to a pitch axis of the blade element; and
    at least three columns formed by respective alternations of surfaces presenting different luminance factors, the columns being mutually parallel and arranged on the blade element in a direction parallel to a flapping axis of the blade element.

9. A device according to claim 8, wherein the checkerboard pattern has five rows formed by respective alternations of surfaces presenting different luminance factors, and nine columns formed by respective alternations presenting different luminance factors.

10. A device according to claim 1, wherein the checkerboard pattern includes a surround having a luminance factor that is substantially equal to the first luminance factor of the first group of surfaces.

11. A device according to claim 1, wherein the surfaces of the first group and the surfaces of the second group are square in shape.

12. A device according to claim 1, wherein the checkerboard pattern includes surfaces of the second group in each of the corners of the shape defined by the two groups of surfaces.

13. A rotorcraft, including a measurement device for measuring the angular positions of a blade element relative to a hub of a rotor according to claim 1.

14. A method of measuring the angular positions about at least one pivot axis of a blade element of a rotorcraft relative to a hub of a rotor, wherein the method comprises the steps consisting in:
    securing at least one checkerboard pattern to the blade element, the checkerboard pattern comprising two groups of surfaces presenting respective different luminance factors, each surface of a first group presenting a first luminance factor and being juxtaposed with at least one surface of a second group presenting a second luminance factor, the first luminance factor being greater than the second luminance factor;

securing to the hub at least one camera suitable for taking a plurality of images of the checkerboard pattern as a function of time;

taking a plurality of images of the checkerboard pattern during a rotation of the rotor;

synchronizing each image taken by the camera with a time parameter that is a function of an azimuth angle of the rotor;

storing each image together with the corresponding time parameter; and automatically determining the angular positions of the blade element relative to at least one pivot axis from the images of the checkerboard pattern.

15. A method according to claim 14, wherein the measurement method comprises a step of determining the angular positions of the blade element about three pivot axes forming an orthogonal reference frame associated with the hub, the orthogonal reference frame comprising a first axis, referred to as a "pitch" axis, a second axis, referred to as a "flapping" axis, and a third axis, referred to as a "lead/lag" axis.

16. A method according to claim 14, wherein the measurement method enables five to 45 images of the checkerboard pattern to be taken over one revolution of the rotor.

* * * * *